(12) United States Patent  
Okuno et al.

(10) Patent No.: US 8,960,524 B2
(45) Date of Patent: Feb. 24, 2015

(54) BURRING APPARATUS FOR FRICTION WELDING MACHINE

(75) Inventors: Takehiro Okuno, Hadano (JP); Ryo Onose, Hadano (JP); Koji Sakane, Hadano (JP); Koichi Homma, Hadano (JP)

(73) Assignee: Nittan Valve Co., Ltd., Hadano-shi (JP)

( * ) Notice: Subject to any disclaimer, the term of this patent is extended or adjusted under 35 U.S.C. 154(b) by 0 days.

(21) Appl. No.: 13/883,717

(22) PCT Filed: Nov. 25, 2010

(86) PCT No.: PCT/JP2010/071052
§ 371 (c)(1),
(2), (4) Date: May 6, 2013

(87) PCT Pub. No.: WO2012/070138
PCT Pub. Date: May 31, 2012

(65) Prior Publication Data
US 2013/0221070 A1    Aug. 29, 2013

(51) Int. Cl.
*B23K 20/12* (2006.01)
*B23K 20/26* (2006.01)
*B23K 37/08* (2006.01)
*B23K 20/00* (2006.01)
*B23D 79/12* (2006.01)

(52) U.S. Cl.
CPC ............... *B23K 20/26* (2013.01); *B23K 20/129* (2013.01); *B23K 37/08* (2013.01); *B23K 20/00* (2013.01); *B23D 79/12* (2013.01); *B23K 20/12* (2013.01)
USPC .......... 228/112.1; 228/113; 228/114; 228/2.1

(58) Field of Classification Search
CPC .... B23K 20/00; B23K 20/12; B23K 20/1205; B23K 20/1285; B23K 20/129; B23K 20/26; B23K 37/08
USPC ................................ 228/112.1, 113, 114, 2.1
See application file for complete search history.

(56) References Cited

U.S. PATENT DOCUMENTS

| | | | | | |
|---|---|---|---|---|---|
| 3,438,561 | A | * | 4/1969 | Calton | 228/13 |
| 3,662,941 | A | * | 5/1972 | Gage | 228/2.3 |
| 3,853,258 | A | * | 12/1974 | Louw et al. | 228/2.3 |
| 6,068,038 | A | | 5/2000 | Kawaura | |
| 2003/0197047 | A1 | | 10/2003 | Kanzaki et al. | |

FOREIGN PATENT DOCUMENTS

| | | |
|---|---|---|
| JP | 49-22364 A | 2/1974 |
| JP | 64-66081 A | 3/1989 |

(Continued)

*Primary Examiner* — Erin Saad
(74) *Attorney, Agent, or Firm* — Westerman, Hattori, Daniels & Adrian, LLP

(57) ABSTRACT

A burring apparatus for a friction welding machine comprises a clamp unit provided at the front end of a horizontal main spindle, for holding work piece W1 coaxial with the main spindle, a clamp unit provided at the front end of a slide movable to and away from the main spindle in the direction of the axis of the main spindle and a doughnut-shaped cutter for shearing off a burr. Work piece W2 is moved forward together with the slide until work piece W2 comes into contact with work piece W1 so that the mated ends of work pieces W1 and W2 are friction welded together to form a joint work piece W. The burr formed on the jointed work piece W is sheared off by the cutter. The jointed work piece W is then liberated from the main spindle.

24 Claims, 12 Drawing Sheets

(56) References Cited

FOREIGN PATENT DOCUMENTS

| JP | 1-133691 A | 5/1989 |
| JP | 2-97983 U | 8/1990 |
| JP | 6-83176 U | 11/1994 |
| JP | 7-26078 U | 5/1995 |
| JP | 11-151583 A | 6/1999 |
| JP | 2003-311437 A | 11/2003 |
| JP | 2005-279713 A | 10/2005 |

* cited by examiner (a) (At the beginning of friction pressure welding)

(b) (At the end of friction pressure welding)

(a)

(b)

(a)

(b)

(c)

BURRING APPARATUS FOR FRICTION WELDING MACHINE

FIELD OF THE INVENTION

This invention relates to a friction welding machine for friction welding a first and a second rod shape work piece by forcing one end of the second work onto one end of the first work in rotation, the machine having a main spindle provided on the front end thereof with a first work holding for gripping the first rod shape work piece and a slide which is coaxial with the main spindle and movable to and away from the main spindle and provided on the front end thereof with a second work holding for gripping the second rod shape work piece coaxially with the first rod shape work piece, and more particularly to a burring apparatus for such friction welding machine, for removing a ring-shaped burr formed round the welded section of the two work pieces by means of a cutter arranged between the primary and slides.

BACKGROUND ART OF THE INVENTION

A patent document listed below discloses a burring apparatus for use with a friction welding machine equipped with: a spindle unit, mounted on the machine table of the friction welding machine and accommodating a main spindle having a rotary chuck for gripping a first work piece; a slide having a fixed chuck for gripping a second work piece coaxially with a first work piece and movable in the axial direction of the main spindle; a pair of cutter arms arranged on the slide to constitute a rotatable annular cutter that surrounds the work pieces; and a slide unit ("auxiliary member" facilitating burring operation) mounted on the slide to support the end of the second work portion of the welded pieces (hereinafter referred to as jointed work piece) and slidably in the axial direction of the welded work pieces.

Specifically, the welding machine is adapted to friction weld the two work pieces by moving the slide towards the spindle unit to thereby press one end of the second work piece onto one end of the first work piece in rotation, and, after the welding, adapted to loosen the chuck of the main spindle holding the welded (jointed) piece and withdraw the first piece end of the jointed work piece from the main spindle by retracting the slide by a predetermined length. Then the cutter arm is rotated to form an annular cutter round the jointed work piece subsequently, the fixed chuck (holding the jointed work piece) is loosened and the slide is retracted backward together with the slide unit (auxiliary member) until the rear legs of the slide unit (auxiliary member) abuts against the metal stopper formed on the machine table of the welding machine to stop the slide unit (auxiliary member), thereby allowing only the slide to go backward. Thus, as the slide is retracted backward, the jointed work piece is forced forward by the slide unit (auxiliary member) with respect to the annular cutter and fixed chuck, thereby causing the blur formed round the welded portion of the jointed work piece to be sheared by the annular cutter. Hence, the burr is automatically removed in a welding cycle.

PRIOR ART DOCUMENT

Patent Document

Patent Document 1: JPA Laid Open H11-151583 (Paragraphs 0005, 0006, and 0009-0014; FIGS. 1-3 and 5.)

BRIEF DESCRIPTION OF THE INVENTION

Problems to be Solved by the Invention

Although the prior art technique disclosed in Patent Document 1 can perform burring in a welding cycle, there remains a few problems unsolved, as described below. First, since the annular cutter is formed of rotatable cutter arms adapted to surround the jointed work piece, the cutter must be formed only after the chuck of the main spindle is loosened and the jointed work piece is liberated from the chuck and retracted by a predetermined length. Otherwise burring operation cannot be done by further retracting the jointed work piece before the annular cutter is formed, as described above. In other words, burring operation cannot be done immediately after welding, because it takes time to rotate the cutter arms to form the annular cutter. As a consequence, it takes a long period of time to complete welding and burring. Second, since it takes time to start burring performed after the completion of friction welding, the burr will get cooled and becomes harder before it is removed. This makes it difficult to neatly remove the blur, and increases consumption of the cutter. Third, in addition to the disadvantages mentioned above, the burring apparatus is structurally very complex due to the facts that the slide unit (auxiliary member) mounted on the slide must be slidable in the axial direction of the slide to retract the slide over a predetermine distance and to form the annular cutter round the jointed material using the rotatable cutter arms. Further, such burring apparatus makes the dimensions of the friction welding machine disadvantageously large.

To overcome such prior art problems mentioned above, the present invention provides a compact burring apparatus for use with a friction welding machine.

Means for Solving the Problems

To achieve the object, the present invention provides a burring apparatus, as defined in claim 1, for a friction welding machine that includes: a horizontally arranged main spindle; a first work holding, provided at the front end portion (nose) of the main spindle, for gripping a first rod shape work piece coaxially with the main spindle; a slide movable to and away from the main spindle along the axis of the main spindle; and a second work holding, arranged at the front end of the slide in opposition to the front end portion (nose) of the main spindle, for gripping a second rod shape work piece of the same diameter as the first rod shape work piece coaxially with the first rod shape work piece,the friction welding machine adapted to friction weld the first and second rod shape work pieces by pressing one end of the second rod shape work piece gripped by the slide onto one end of the first rod shape work piece while the first rod shape work piece is in rotation together with the main spindle, the burring apparatus characterized by comprising a doughnut shape cutter having an inner diameter slightly larger than the outer diameter of the rod shape work pieces, and movable in the axial direction of the main spindle, the doughnut shape cutter arranged in a region ahead of the main spindle and the first rod shape work piece gripped by the main spindle.

(Function) As the second rod shape work piece gripped by the second work holding of the slide is moved forward through a doughnut shape cutter arranged ahead of the main spindle and brought into forced contact with the first rod shape work piece which is gripped and held in rotation by the first work holding of the main spindle, the mated ends of the two work pieces are friction welded on one axial side of the cutter proximate to the main spindle and a ring shape burr is created around the jointed sections of the work pieces.

The opposite end portions of the work pieces, now jointed in the welding, are held by the respective work holdings of the main spindle and slide, and extends through the doughnut cutter. The burr is formed round the welded section of the jointed work piece which is located closer to the main spindle than to the cutter.

Then, by moving the cutter towards the main spindle across the burr, the burr formed at the jointed region of the jointed work piece is sheared. The jointed work piece is liberated from the first work holding of the main spindle, and the slide is retracted backward (that is, moved away from the main spindle) to extract the jointed work piece from the main spindle and the cutter. The ring shape burr is held back by the cutter and drops from the jointed work piece as the jointed work piece is extracted from the doughnut shape cutter.

In this manner, the burr is instantly sheared off immediately after the friction welding of two work pieces.

It is noted that this burring apparatus is very simple and compact in structure in that the apparatus consist of: a doughnut shape cutter having an inner diameter for passing therethrough a first and second rod shape work piece, doughnut shape cutter arranged between the main spindle and the slide and movable between them, and a cutter drive means for moving the cutter coaxially with the main spindle.

The burring apparatus defined in claim 1 may be equipped with a cutter drive means in the form of an annular hydraulic cylinder provided at the front end of the casing of, and surrounding the front end portion (nose) of the main spindle accommodating the work holding, as defined in claim 2.

(Function) Since the cutter drive means is given in the form of an annular hydraulic cylinder provided at the front end of the casing of and surrounding the front end portion (nose) of, the main spindle, the doughnut shape cutter may be accurately moved along the axis of the main spindle and the main spindle can be constructed in a compact form in axial as well as longitudinal dimensions.

The burring apparatus defined in claim 1 or 2 may be located at a minimum distance from the front end of the first rod shape work piece gripped by the main spindle such that the cutter will not interfere with the burr that could be created in the friction welding.

(Function) In a conventional friction welding machine, friction welding is performed on a first rod shape work piece in rotation and an advancing second rod shape work piece without having a burring cutter located between them. In contrast, in the present invention, friction welding is performed on the second rod shape work piece passing through the cutter located in front of the first rod shape work piece. To do this, the length d (FIG. 2) of the projecting portion (not gripped by the work holding) of the second work needs to be longer than the conventional hangover by at least the thickness of the cutter to prevent the work holding from interfering with the cutter. This is to avoid melting and/or degradation of the cutter by heat that can be otherwise caused if the cutter comes into contact with the burr during welding, and ensure smooth welding and burring operation.

However, as the hangover of the second shape work is made larger, the welding portions of the first and second work pieces can be misaligned from the axis of the main spindle and the precision of the jointed work piece will be lost when they are welded.

On the other hand, in the burring apparatus defined in claim 3, the doughnut shape cutter is arranged at a location as close as possible to the front end of the first rod shape work piece without touching the burr that could be created in the welding of the work pieces. Accordingly, the projection length d of the second rod shape work piece can be shortened while preventing misalignment of the two work pieces with respect to the axis of the main spindle during the welding.

In the burring apparatus defined in claim 2 or 3, the doughnut shape cutter may be connected to the front end of the hydraulic cylinder (in the form of a hollow-cylindrical piston) by guide pins such that the cutter can slide in the axial direction of the main spindle and is urged by a spring (provided between the piston and the cutter) in the direction away from the piston, as defined in claim 4, and that the cutter is pushed and moved backward by the front end of the slide when the second rod shape work piece is moved towards the first rod shape work piece for welding.

(Function) It is noted that if the hangover (that is, the hangover not gripped by the second work holding) is longer than the prior art length by at least the thickness of the cutter, as defined in claim 3, a misalignment of the welding portions of the two work pieces with respect to the axis of the main spindle may take place, thereby possibly resulting in a poor welding precision of the jointed work piece with a certain axial misalignment of the two work pieces.

To prevent this, the doughnut shape cutter can be made smoothly movable in the backward direction (that is, towards the main spindle) against the force of the spring, as defined in claim 4. As a consequence, even if the hangover of the second rod shape work piece is shortened to the extent that the front end of the slide almost interferes with the cutter, the cutter is forced by the second work holding at the front end of the slide to move backward smoothly as the second rod shape work piece is moved forward through the cutter. Thus, friction welding of the first and second work pieces is performed properly without being hindered by the cutter. Accordingly, axial misalignment of the welded work pieces during welding with respective to the axis of the main spindle that could otherwise occur with a shortened projecting portion of the second rod shape work piece is suppressed.

The doughnut shape cutter of the burring apparatus in accordance with any one of claims 1 through 4 may be configured to have an inner diameter D about 1.1 times the outer diameter D'of the rod shape work pieces (D ≈1.1 D'), as recited in claim 5.

(Function) If the inner diameter of the doughnut shape cutter is much larger than the outer diameter of the work pieces, the burr will not be neatly sheared off, and a cumbersome post-welding treatment of the jointed work piece will be necessary. On the other hand, if the inner diameter of the doughnut shape cutter is too close to the outer diameter of the work pieces, that is, if the gap between the cutter and the work pieces is too small, the surfaces of the work pieces are likely to be hollowed, making the jointed work piece defective. The inventors of the present invention have found through much experimentation that the optimum inner diameter D of the doughnut cutter is about 1.1 times the outer diameter D' of a rod shape work piece (D ≈1.1 D') irrespective of the outer diameter of the work. When the inner diameter D of the doughnut shape cutter is about 1.1 times the outer diameter D' of the rod shape work piece (D ≈1.1 D'), the burr is neatly sheared off from the jointed work piece by the cutter and the resultant surface of the jointed work piece is sufficiently smooth.

Results of the Invention

The burring apparatus for a friction welding machine in accordance with the invention can shear off a burr immediately after friction welding of work pieces, so that welding and burring can be done in a short period of time.

Since the burr is sheared off while it is soft immediately after welding, the burr can be neatly removed, leaving the surface of the welded pieces smooth. For this reason, the joined piece requires a simple post-welding treatment.

This burring apparatus is structurally so simple and compact that the friction welding machine can equip the burring apparatus without increasing its dimensions.

The doughnut shape cutter can be accurately moved in the axial direction of the main spindle by means of a cutter drive means in the form of an annular hydraulic cylinder provided at the front end portion of the main spindle, as recited in claim 2. This ensures neat and smooth removal of a burr. Since this annular hydraulic cylinder is very simple and compact in structure, the friction welding machine as a whole can be made compact.

The hangover of the second rod shape work piece W2 can be shortened by arranging the doughnut shape cutter close to the front end of the first rod shape work piece W gripped by the main spindle, as recited in claim 3. Thus, axial misalignment of the two work pieces with respective to the axis of the main spindle can be minimized, thereby increasing the precision of the axial alignment of the welded work pieces.

A possible misalignment of the two rod shape work pieces during welding can be further minimized by shortening the projecting portion of the second work piece to an extent that the front end of the slide (or work holding) can almost, but will not, interfere with the cutter, as recited in claim 4.

According to claim 5, not only a burr can be neatly removed but also the surfaces of the work pieces subjected to a burring operation turns out to be contiguous and smooth.

BRIEF DESCRIPTION OF THE DRAWINGS

FIG. 8(a) shows the second work piece moved forward to be abutted against the first work piece immediately before they are welded; and FIG. 8(b) conditions of the first and second work pieces when the welding is finished.

FIG. 12(a) shows a front view of the cutter; and FIG. 12(b) a front view of a blade section of the cutter (referred to as cutter blade).

BEST MODE FOR CARRYING OUT THE INVENTION

The invention will now be described by way of example with reference to the accompanying drawings. FIGS. 1-10 show a burring apparatus for a friction welding machine in accordance with a first embodiment of the invention. More particularly, FIGS. 1-5 show a friction welding machine equipped with an inventive burring apparatus, along with relevant portions of the friction welding machine. FIGS. 6-10 illustrate in sequence steps of friction welding and subsequent burring operation.

Figure 1:
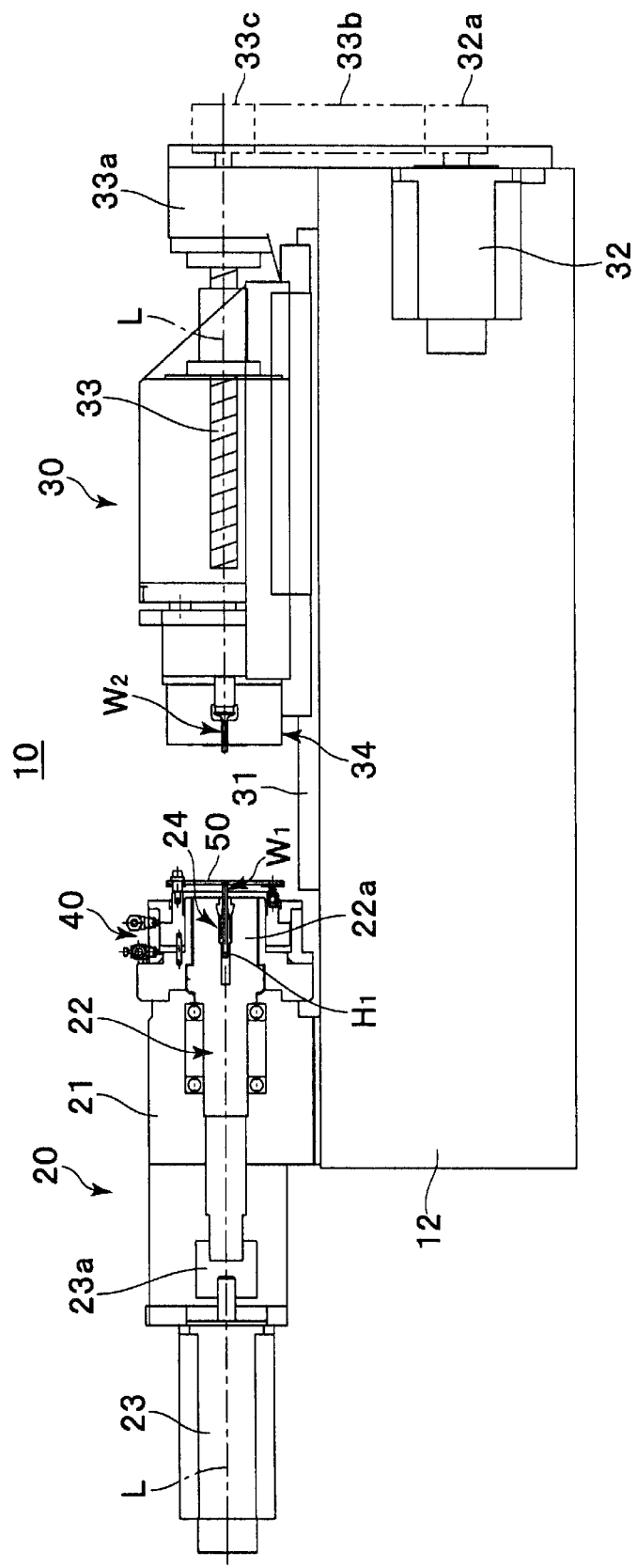
FIG. 1 shows a longitudinal cross section of a burring apparatus for a friction welding machine in accordance with a first embodiment of the invention.
Figure 7:
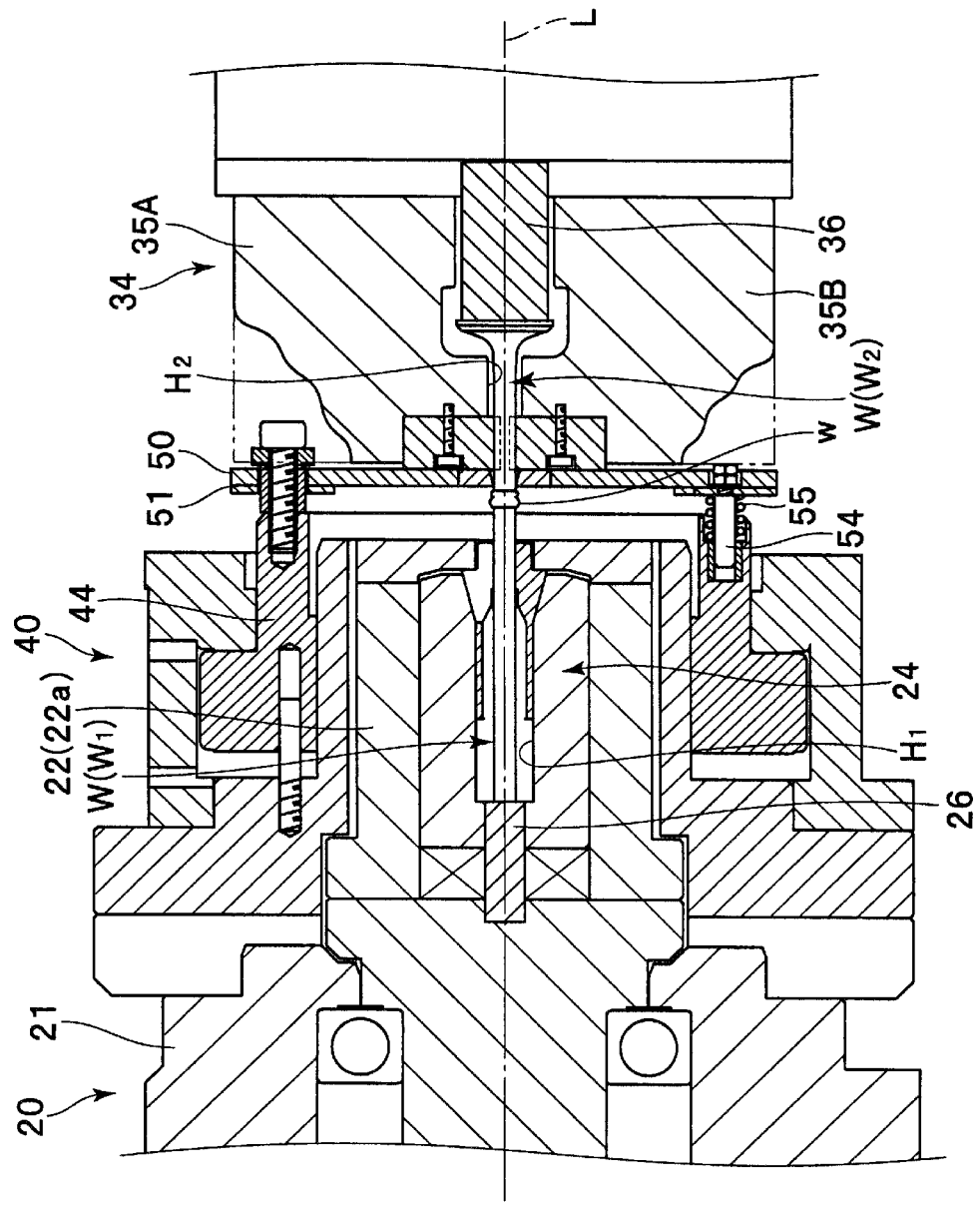
FIG. 7 shows in enlarged longitudinal cross section of a relevant portion of the burring apparatus subsequent to friction welding of work pieces.
Figure 10:
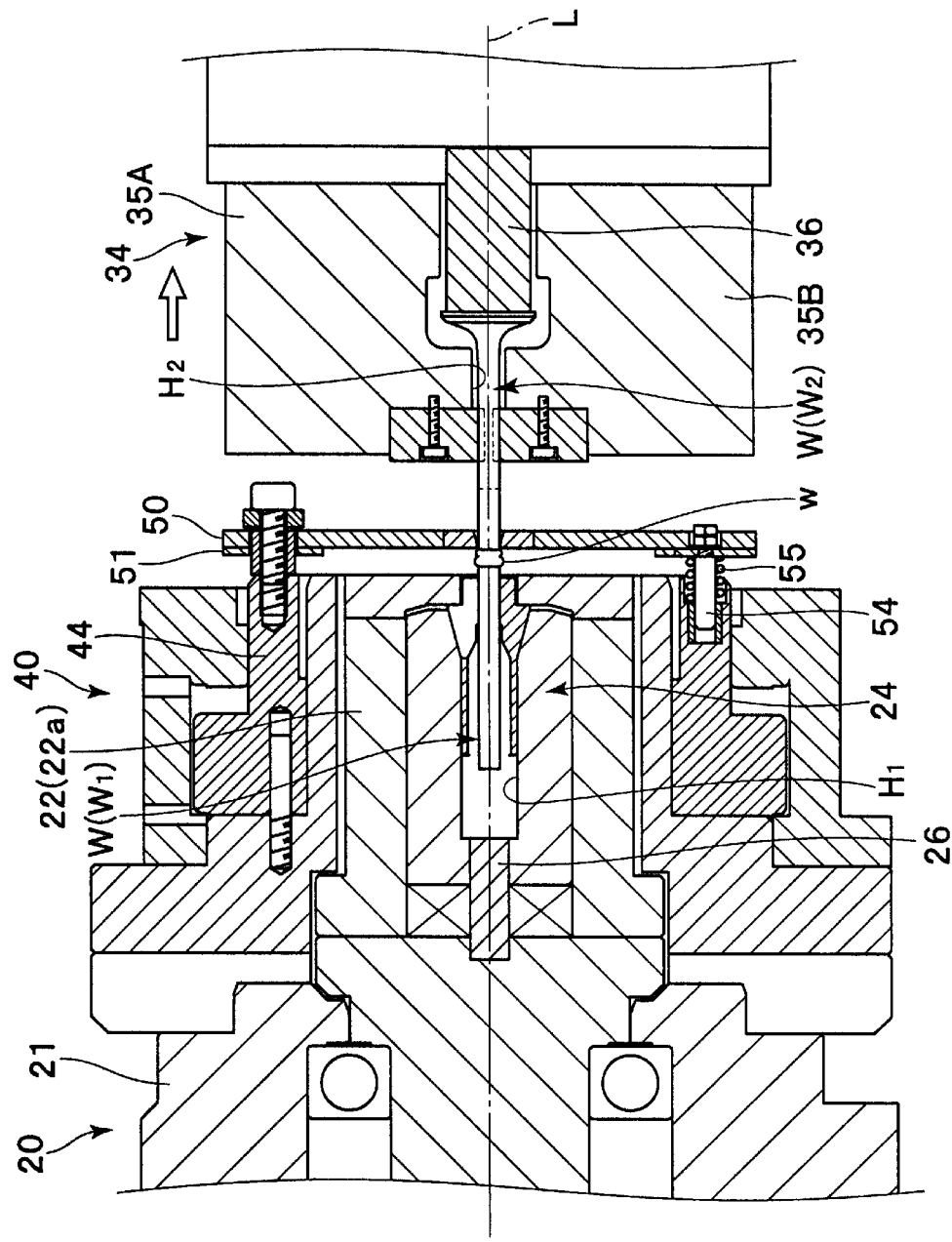
FIG. 10 shows in enlarged longitudinal cross section a relevant portion of the burring apparatus in operation, where the jointed work piece is retracted together with the slide to remove the burr from the jointed work pieces.

A friction welding machine 10 is a machine for manufacturing, for example, a puppet valve for use with an internal combustion engine having an umbrella-shaped first portion made of a first rod shape work piece W1 and a second portion integral therewith and made of a second rod shape work piece w2 by friction welding the mated ends of the first and second work pieces as shown in FIGS. 7 and 10, wherein, for example, the first work piece W1 is a mechanically strong metal (e.g. SUH11) while the second work piece W2 is a good heat resisting metal (e.g. SUH35). As shown in FIG. 1, the machine has a horizontal main spindle 22 for gripping a first rod shape work piece W1, and a slide 30, movable in the axial direction of the main spindle 22, for gripping a second rod shape work piece W2 of the same outer diameter as the first rod shape work piece W1. The machine is designed to press one end of the second work piece W2 against one end of the first work piece W so as to friction welding the two ends.

As shown in FIG. 1, the friction welding machine 10 has a main frame 12, on which a spindle unit 20 is mounted in opposition to the slide 30 (slide) that is movable relative to the spindle unit 20 and away from the spindle unit 20 (that is, leftward and rightward in FIG. 1). The spindle unit 20 accommodates the main spindle 22.

The main spindle 22 is rotatably supported by a housing 21 of the spindle unit 20 serving as the casing of the main spindle 22, and can be driven by a servomotor 23 provided at the rear end of the spindle unit 20 via a coupling 23a. Provided at the front end portion 22a(hereinafter referred to as spindle nose 22a) of the main spindle 22, which projects forward from the casing 21, is a work holding or chuck unit 24, having a work insertion hole HI.

As shown in FIG. 23, the chuck unit 24, generally called collet chuck, has a cylindrical sleeve 25 provided inside the front end portion)(hereinafter referred to as nose 22a) of the main spindle 22; a work insertion hole H1 formed inside the sleeve 25; a stopper provided inside the work insertion hole H1 for regulating the length of the work piece W1 inserted therein; a collet chuck 27 provided at the entrance of the work insertion hole H1; and a cap 28 fixed to the nose 22a and adapted to abut against the step portion 27a of the collet chuck 27. The collet chuck 27 has three longitudinal slits 27b1 circumferentially spaced apart at equal angular intervals and is provided at the tip thereof with three chuck jaws 27b movable in radial directions, as shown in FIG. 3. The cylindrical sleeve 25 is movable in the axial direction thereof, and urged forward (rightward in FIG. 2) by a spring so that the tapered face 25b of the cylindrical sleeve 25 engages with the opposing tapered face 27c of the collet chuck 27. As a consequence, the chuck jaws 27b of the collet chuck 27 are always urged to decrease the inner diameter of the work insertion hole H1.

The sleeve 25 can be moved backward (leftward in FIG. 2) by a hydraulic cylinder structure (not shown) against the spring force of a disc spring 25a. When the force urging the opposing tapered face 27c of the chuck 27 exerted by the tapered face 25b of the sleeve 25 is removed, the force urging the chuck jaws 27b of the chuck 27 (to narrow the work insertion hole H1) disappears.

Thus, the chuck unit 24 performs engagement and disengagement of the first rod shape work piece W1 inserted in the work insertion hole H1. The first rod shape work piece W1 is held in the work insertion hole H1 coaxially with the main spindle 22 when it is chucked with the chuck unit 24.

Figure 4:
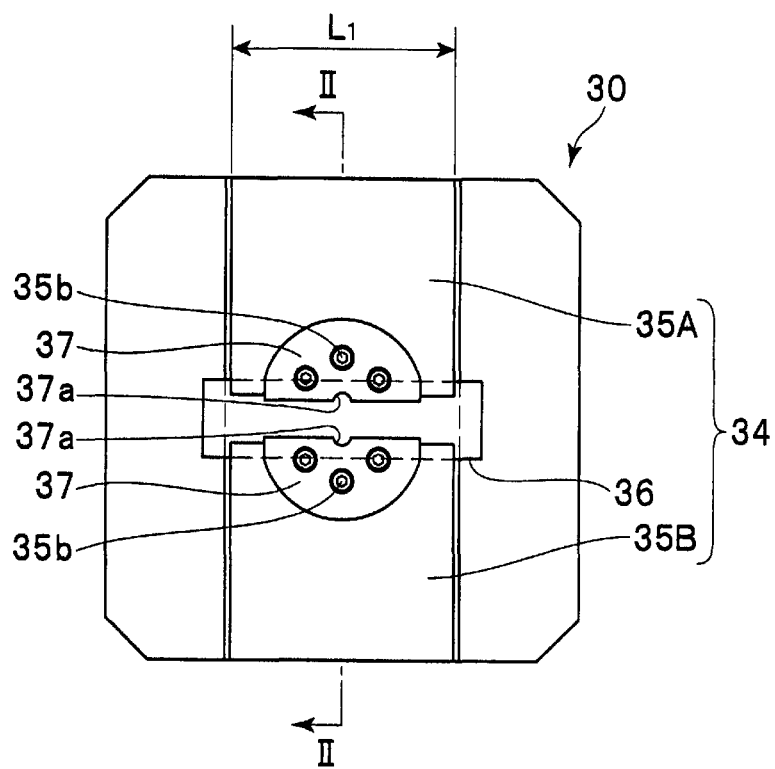
FIG. 4 shows a front view of a clamp unit of the work holding provided on a slide.

On the other hand, the slide 30 is mounted on the main frame 12 via a linear guide 31 such that it is movable to and away from the spindle unit 20 when driven by a ball screw 33 rotated by the servomotor 32. Reference numeral 33a indicates a shaft supporting portion of the ball screw 33 mounted on the main frame 12. The rotation of the servomotor 32 is transmitted to the ball screw 33 via a drive pulley 32a connected to the shaft of the servomotor, a timing belt 33b, and a driven pulley 33c. Provided at the front end of the slide 30 facing the spindle unit 20 is a clamp unit 34 serving as a work holding, as shown in FIGS. 1, 2, and 4.

The clamp unit 34 includes a pair of generally rectangular block-shaped clamp jaws 35A and 35B that can be cooperatively moved up and down, and a hydraulic cylinder structure (not shown) for driving the clamp jaws 35A and 35B. Each of the clamp jaws 35A and 35B has a pocket 35a formed on the upper/lower opposing end thereof in association with the umbrella-shaped portion of the second rod shape work piece W2. A work insertion hole H2 is formed between the clamp jaws 35A and 35B such that the length of the work piece W2 inserted in the work insertion hole H2 is limited by a stopper 36. Integrally secured to the front end of the clamp jaws 35A and 35B with bolts 35b are clamp pads 37 each having an arcuate clamp portion 37a having the same diameter as the outer diameter of the second rod shape work piece W2.

To insert or withdraw the second rod shape work piece W2 having the umbrella-shaped portion into or from the work insertion hole H2 from one side of the clamp jaws 35A and 35B, the work insertion hole H2 is widened in the vertical direction (FIG. 2) by loosening the clamp unit 34. After the second rod shape work piece W2 is inserted in the work insertion hole H2 and placed in position in abutment against the stopper 36, the work piece is clamped from above and below with the clamp unit 34 (clamp jaws 35A and 35B) and secured coaxially with the first work piece W1.

Figure 2:
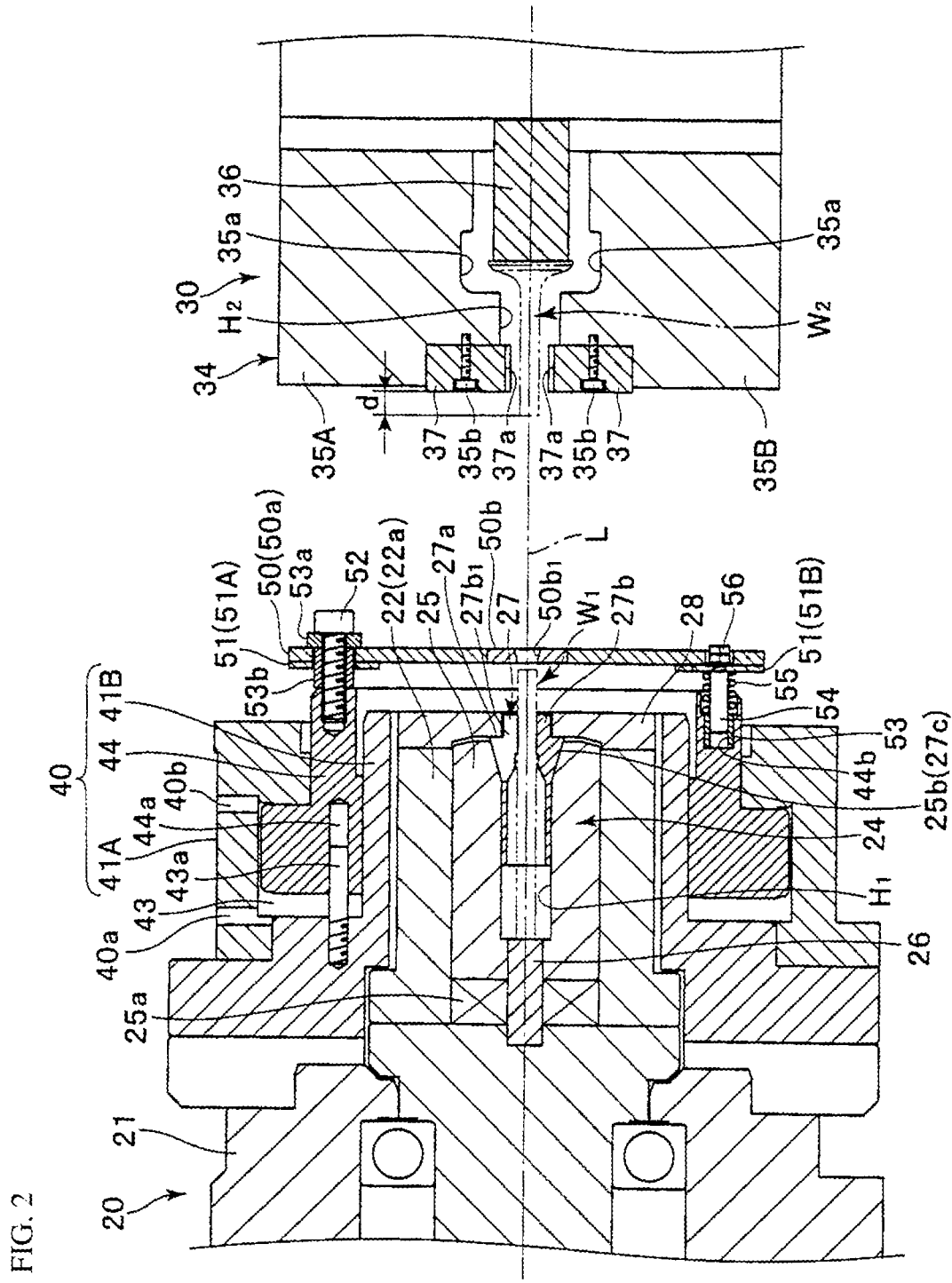
FIG. 2 shows an enlarged longitudinal cross section of a relevant portion of the burring apparatus taken along line II-II of FIGS. 3, 4, and 5.
Figure 3:
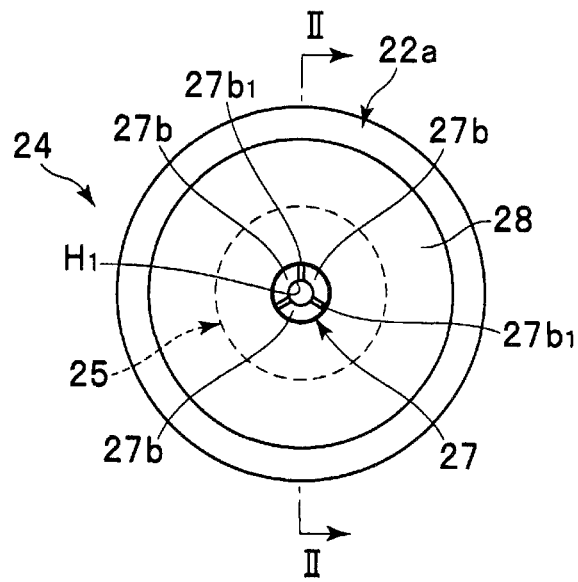
FIG. 3 shows a front view of a chuck unit of a work holding provided on the main spindle of the welding machine.

Mounted on the front end portion of the housing 21 of the spindle unit 20 is an annular hydraulic cylinder 40 surrounding the spindle nose 22a of the main spindle 22, as shown in FIG. 2.

The hydraulic cylinder 40 has a stepped piston 44 arranged in a cylinder tube 43 defined by an inner casing 41 and an outer casing 42. The piston 44 is moved forward or backward by a hydraulic fluid injected into or discharging from the cylinder tube 43 through a pair of inlet/outlet ports 40a and 40b. To stop the rotation of the piston 44, a guide pin 43a is provided, which projects from the bottom of the cylinder tube 43 and engages with an axial guide hole 44a formed in the bottom of the piston 44.

Figure 5:
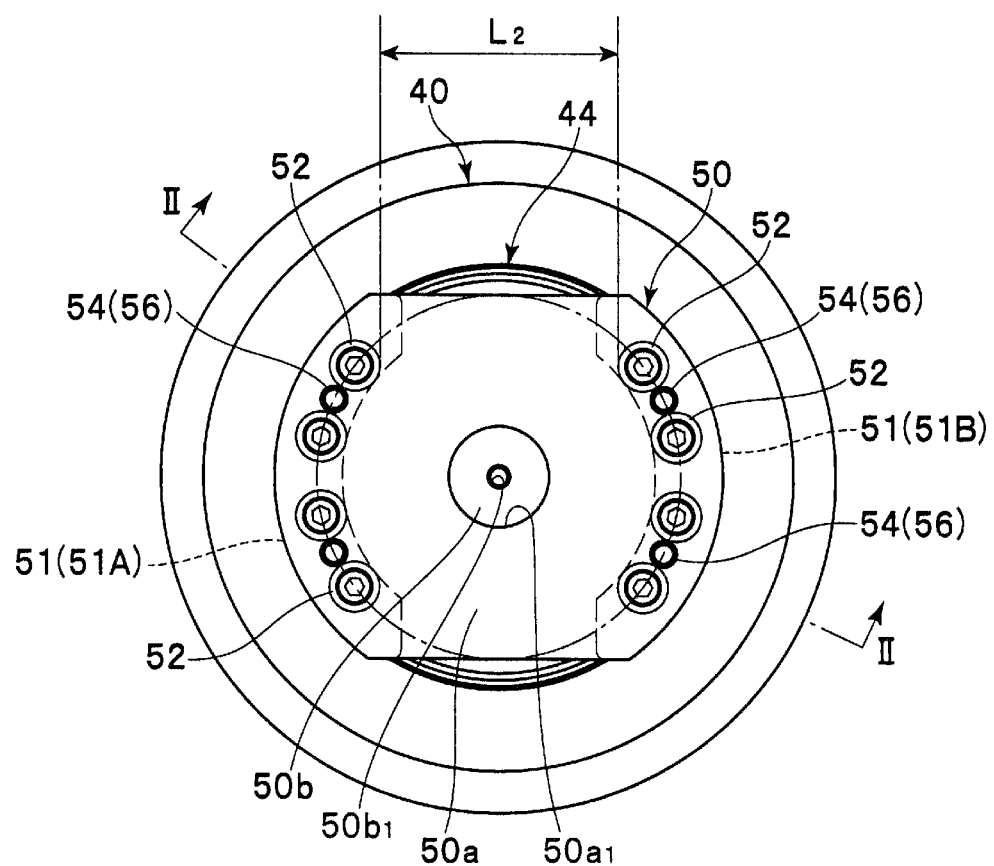
FIG. 5 shows a front view of a doughnut shape cutter.

As shown in enlarged view in FIGS. 2 and 5, a doughnut shape cutter 50 is connected to the front end of the piston 44 by means of eight fixing bolts 52 and four guide pins 54 such that the cutter 50 is located at a predetermined distance from the front end of the first rod shape work piece W1 chucked by the chuck unit 24 located at the nose of the main spindle 22 perpendicularly to, and coaxial with, the axis L of the main spindle 22.

The doughnut shape cutter 50 has a generally planar cutter blade 50a connected to the piston 44, and a disk shape cutter blade 50b fixedly secured in an engagement hole 50a1 formed at the center of the cutter blade 50a by means of screws, for example. The cutter blade 50b has a circular hole 50b1 for shearing a burr, and is flush with the cutter blade 50a.

The doughnut shape cutter 50 is stacked with a pair of arcuate sheet members 51 (51A and 51B) formed along the circular edge of the cutter blade 50a, and is urged by a spring so as to be displaced from the front end of the piston 44.

As shown in FIG. 5, four fixing bolts 52 are arranged along the respective right and left arcuate sheet members 51 (51A and 51B). Guide pins 54 are provided between some of neighboring fixing bolts 52.

Each of the fixing bolts 52 is screwed into the front end of the piston 44 via a washer 53a and a collar 53b, as shown in FIG. 2. The doughnut shape cutter 50 and arcuate sheet members 51 can slide in the axial direction thereof, along the outer periphery of the collar 53b.

On the other hand, the guide pins 54, each fixed with a nut 56, protrude from the respective rear ends of the arcuate sheet members 51. The guide pins 54 slidably engage with a bush 53 force fitted in a stepped bore 44b formed in the front end of the piston 44. Arranged in a stepped space formed between the arcuate sheet members 51 and the stepped bore 44b is a compression coil spring 55.

In this way, the doughnut shape cutter 50 is acted upon by a force of the compression coil spring 55 via the paired right and left arcuate sheet members 51A and 51B. Depending on the overhang d of the work piece W2 not gripped by the clamp unit 34, the clamp unit 34 (clamp jaws 35A and 35B), arranged at the front end of the slide 30 and moving forward together with the second rod shape work piece W2, can interfere with the doughnut shape cutter 50. In the process of moving forward the second work piece W2 through the cutter circular hole 50b1 of the cutter 50 for friction welding, the doughnut shape cutter 50 and arcuate sheet members 51 are pushed back (or sunk) by the clamp unit 34 in the direction of the axis L so that the first and second rod shape work pieces W1 and W2, respectively, are friction welded under a predetermined optimum friction acting on the mated end faces thereof. The compression coil spring 55 preferably provides the work pieces W1 and W2 with a force that is weak enough not to influence the friction welding. For example, the force of the compression coil spring 55 is about 85N, as opposed to a friction force of about 6500N during friction welding of the first and second work pieces W1 and W2, respectively.

The fixing bolts 52 and guide pins 54 are respectively arranged on the right and left sides of the doughnut shape cutter 50 as shown in FIG. 5, spaced apart by a distance L2, which is sufficiently larger than the horizontal width L1 (FIG. 4) of the clamp unit 34 (clamp jaws 35A and 35B) mounted on the front end of the slide 30. As a consequence, when the front end of the slide 30 abuts against the doughnut shape cutter 50 as it moves forward, the clamp unit 34 (clamp jaws 35A and 35B) of the slide 30 will not interfere with the fixing bolts 52 of the cutter 50 or the guide pins 54. But since the central flat end of the clamp pads 37 projecting forward from the clamp jaws 35A and 35B abut against a central flat area of the cutter 50, the doughnut shape cutter 50 and arcuate sheet members 51 accurately sink (or moves backward) along the axis L.

In a conventional friction welding machine, a first rod shape work piece W1 in rotation and a second rod shaped rod work piece W2 are friction welded without a burring cutter arranged between them. In contrast, in the present invention, a second rod shape work piece W2 is moved forward through the circular hole 50b1 of the doughnut shape cutter 50 arranged in front of the first work piece W1 before the work piece W2 is friction welded to the first work piece W1. In this case, the length d of the projecting portion of the work piece W2 not gripped by the clamp unit 34 must be longer than the projecting portion of a conventional second work piece W2 by at least the length that amounts to the thickness of the doughnut shape cutter 50 so that the clamp unit 34 (clamp jaws 35A and 35B) of the front end of the slide 30 will not interfere with the doughnut shape cutter 50. Otherwise, the burr created in the friction welding of the two work pieces W1 and W2 may touch the cutter and deteriorate it by frictional heat or can melt down on the cutter, thereby preventing subsequent smooth welding and burring.

On the other hand, if the overhang d of the second rod shape work piece W2 is very long, the welding portions of the first and second work pieces W1 and W2, respectively, can be misaligned with respect to the axis L of the main spindle 22 during welding, thereby resulting in an axially skewed jointed work piece of the first and second work pieces (W1 and W2). That is, the resultant jointed piece can have a poor axial precision. in this embodiment, therefore, the doughnut shape cutter is first arranged in front of the first rod shape work piece W I as close as possible but not to touch the burr w created between the first and second work pieces. Thus, the overhang d of the second rod shape work piece W2 can be shortened to suppress the misalignment of the end portions of the first and second rod shape work pieces W1 and W2, respectively, from the axis L of the main spindle 22 during the friction welding.

Second, the doughnut shape cutter 50 is not only slidable along the axis L of the main spindle 22 by the help of the guide pins 54, but also smoothly movable backward against the forwardly urging force of the compression coil spring 55 when pushed backward. Hence, the doughnut shape cutter 50 is pushed by the work holding 34 provided at the front end of the slide 30 and smoothly moved backward in association with the forward motion of the second rod shape work piece W2 through the doughnut shape cutter 50. As a consequence, smooth friction welding of the first and second work pieces is by no means prevented. Furthermore, the welded portions of the work pieces W1 and W2 will not be misaligned with respect to the axis L of the main spindle 22 during friction welding by decreasing the overhang d of the second rod shape work piece W2 to a degree that the front end (clamp unit 34) of the slide 30 can almost, but will not, interfere with the cutter doughnut shape cutter 50.

Based on many preliminary product tests, the inventors of the present invention have found an optimum inner diameter D of the circular hole 50b1 of the doughnut shape cutter 50 to be about 1.1 times the outer diameter D'(that is, D ≈1.1 D') of the rod shape work pieces WI and W2. In this configuration, the rod shape work piece W2 can smoothly pass through the circular hole 50b1 of the doughnut shape cutter 50 in the process of friction welding, and the peripheral burr can be neatly and smoothly sheared off from the jointed work piece in burring operation.

If the inner diameter of the circular hole 50b1 is too large as compared with the outer diameter of the rod work pieces W1 and W2, the burr w will not be completely removed, leaving a residue on the jointed work, which must be removed in an extra post-welding treatment. On the other hand, if the inner diameter of the central hole 50b1 is too close to the outer diameter of the rod shape work pieces W1 and W2, that is, the gap between the central hole 50b1 and the rod shape work pieces W1 and W2 is too small, the rod shape work piece W2 cannot smoothly move forward through the central hole 50b1 in the welding operation, but also the surface of the work pieces can be damaged by the cutter in the burring operation.

It is noted that, irrespective of the outer diameter d of the rod shape work pieces WI and W2, the burr will be neatly sheared and the sheared surface of the jointed work piece will be smooth if the inner diameter D of the doughnut shape cutter 50 is about 1.1 times the outer diameter D' (that is, D ≈1.1 D') of the rod shape work pieces WI and \W2.

It is also noted that the circular hole 50b1 has a straight wall portion 50b11 having a substantially constant radius and a predetermined longitudinal length and a tapered wall portion 50b12 increasing in radius towards the front end of the cutter, as shown in FIG. 8(a). The tapered wall portion 50b12 is provided to help the rod shape work piece W2 to pass through the center hole 50b1 easily during insertion of the work piece W1 from the front end of the doughnut shape cutter 50 into the work insertion hole H1 of the nose 22a of the main spindle 22. Hence, the portion is not necessarily be tapered and its wall can be also straight.

Referring to FIGS. 2 and 6 through 10, there is shown a process of friction welding a first and a second rod shape work piece (W1 and W2) and a process of shearing a ring-shaped burr created in the welding.

Figure 6:
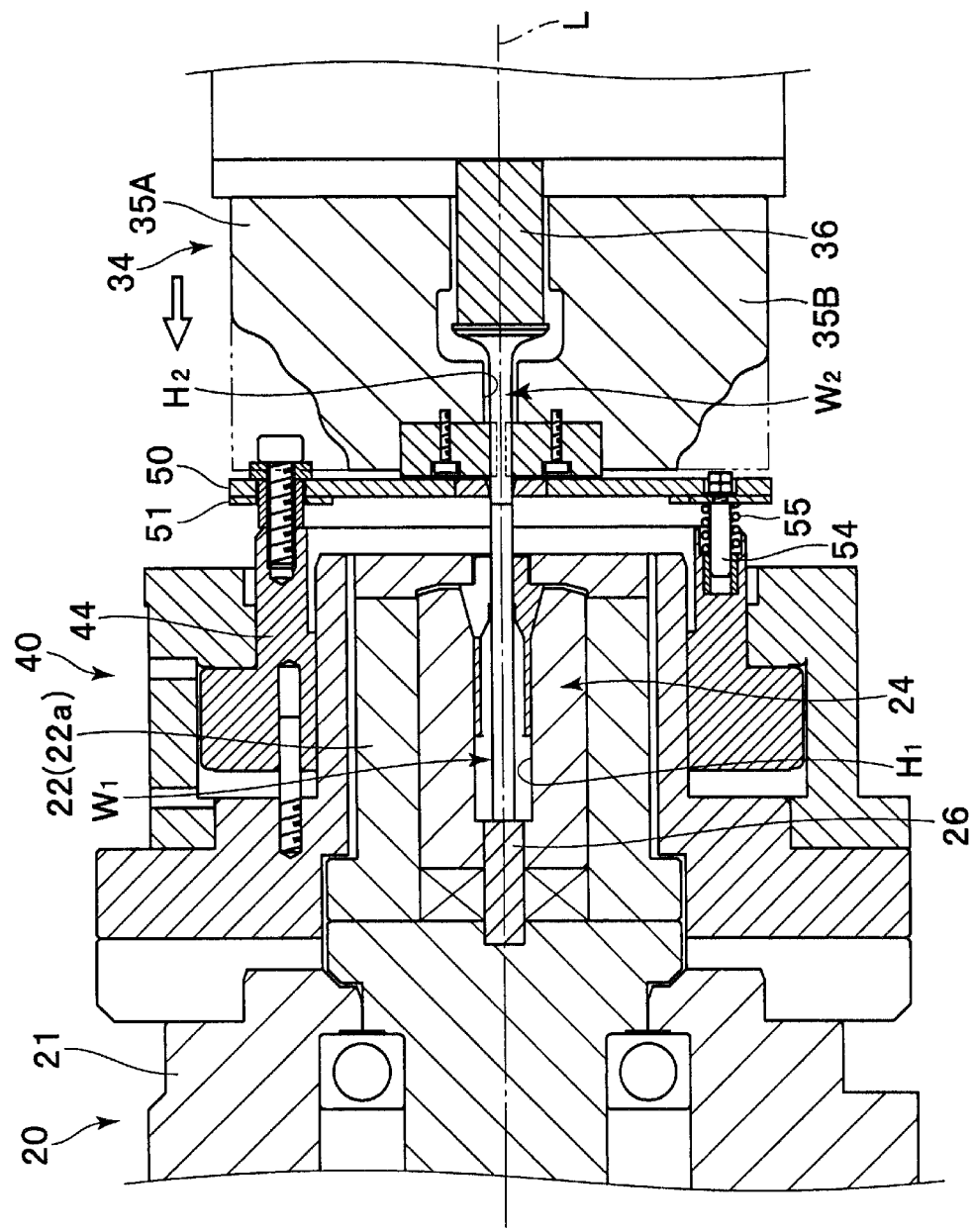
FIG. 6 shows in enlarged longitudinal cross section a relevant portion of the burring apparatus immediately before a second work is moved forward and welded to a first work piece.

First, the first rod shape work piece W1 is inserted in the work insertion hole H1 of the nose 22a of the main spindle 22 mounted on the spindle unit 20, and is secured (chucked) by the chuck unit 24 as shown in FIG. 2. On the other hand, the second rod shape work piece W2 is inserted in the work insertion hole H2 of the slide 30 which is sufficiently spaced apart from the spindle unit 20, and is clamped with the clamp unit 34. Next, the first rod shape work piece W1 is rotated by the servomotor 23 together with the main spindle 22. At the same time the second rod shape work piece W2 is moved forward together with the slide 30 by operating the servomotor 32. The second rod shape work piece W2 is moved forward through the doughnut shape cutter 50 until it is pressed against the first rod shape work piece W1 in rotation together with the main spindle 22, as shown in FIGS. 6 and 7, so that the mated ends of the work pieces W1 and W2 are friction welded on one axial side of the cutter 50 proximate to the main spindle 22.

More specifically, the mated ends of the work pieces W1 and W2 are heated by frictional heat under a predetermined friction-generating propulsion force (of 6500 N for example). An upset propulsion force (of 13000N for example) is applied to the work piece W2 immediately after the first rod shape work piece W1 is quickly stopped to complete friction welding. A ring shape burr w is then formed round the welded section of the jointed work piece.

Figure 8:
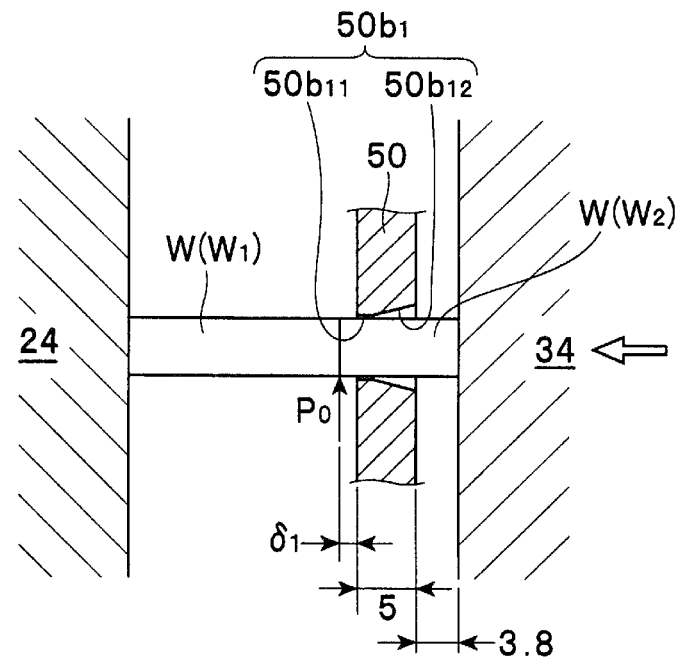
FIG. 8 is a schematic diagram illustrating a process of friction welding of a fist and a second work piece. More particularly.
Figure 8:
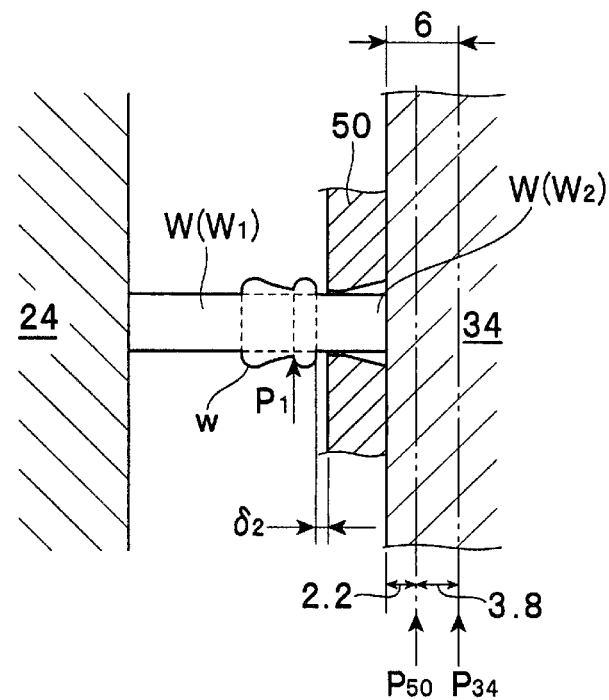

Referring to FIG. 8, there is shown in schematic view how the work pieces W1 and W2 are friction welded. More particularly, FIG. 8(a) illustrates the work piece W2 moved close to the work piece W1 immediately before it is brought into contact with the first work piece W1 (as shown in FIG. 6).

FIG. 8(*b*) illustrates a burr w created immediately after the welding of the first and second work pieces W1 and W2, respectively (as shown in FIG. 7).

In the example shown herein, the first rod shape work piece W1 is made of SUH11, and has a length of 100 mm and an outer diameter of 6 mm, while the second rod shape work piece W2 is made of SUH35, and has a length of 50 mm and an outer diameter of 6 mm. The first and second rod shape work pieces W1 and of W2, respectively, will be shortened by welding by 6 mm in total. The gap d1 between the front end of the first rod shape work piece W1 and the doughnut shape cutter 50 is 1.2 mm. The overhang d of the second rod shape work piece W2 allowed for the clamp unit 34 of the slide 30 to interfere with the doughnut shape cutter 50 during friction welding is set to 10 mm. It is noted that in FIG. 8 symbol P0 indicates the position where the first and second work pieces W1 and W2 mated together for welding; P1 welding position of the work pieces W1 and W2 (corresponding to position P0 of FIG. 8(*a*)); P34 the position of the front end of the clamp unit 34 immediately before welding; and P50 the position of the front face of the doughnut shape cutter 50 immediately before welding.

In friction welding, the slide 30 (clamp unit 34) is moved forward as shown in FIG. 8 so as to move, through the doughnut shape cutter 50, the front end of the work piece W2 to a predetermined position (referred to as friction welding starting position) where the front end of the work piece W2 abuts against the front end of the work piece W1. The slide 30 is then further pushed forward 3.8 mm with a friction-generating propulsion force and interferes with the cutter 50. When the slide 30 (clamp unit 34) comes into interference with the doughnut shape cutter 50, the rotation of the first work piece W1 is quickly stopped, and at the same time the slide 30 is moved forward with a great impulsive force (to transmit an upset impulse onto the mated welding ends of the first and second work pieces W1 and W2, respectively), until the slide 30 (W2) and doughnut shape cutter 50 are further moved forward about 2.2 mm, creating a ring shape burr round the welded sections of the first and second work pieces W1 and W2, respectively as shown in FIG. 8(*b*).

When the welding is completed, the opposite ends of the welded pieces are supported by the main spindle 22 (chuck unit 24) and the slide 30 (clamp unit 34) across the doughnut shape cutter 50 (that is, across the circular hole 50*b*1), as shown in FIG. 7. A ring-shaped burr w is formed round the welded portion of the jointed work piece which is located closer to the main spindle 22 rather than to the cutter 50. The distance d2 between the burr w and the doughnut shape cutter 50 is 0.7 mm, as shown in FIG. 8(*b*).

Figure 9:
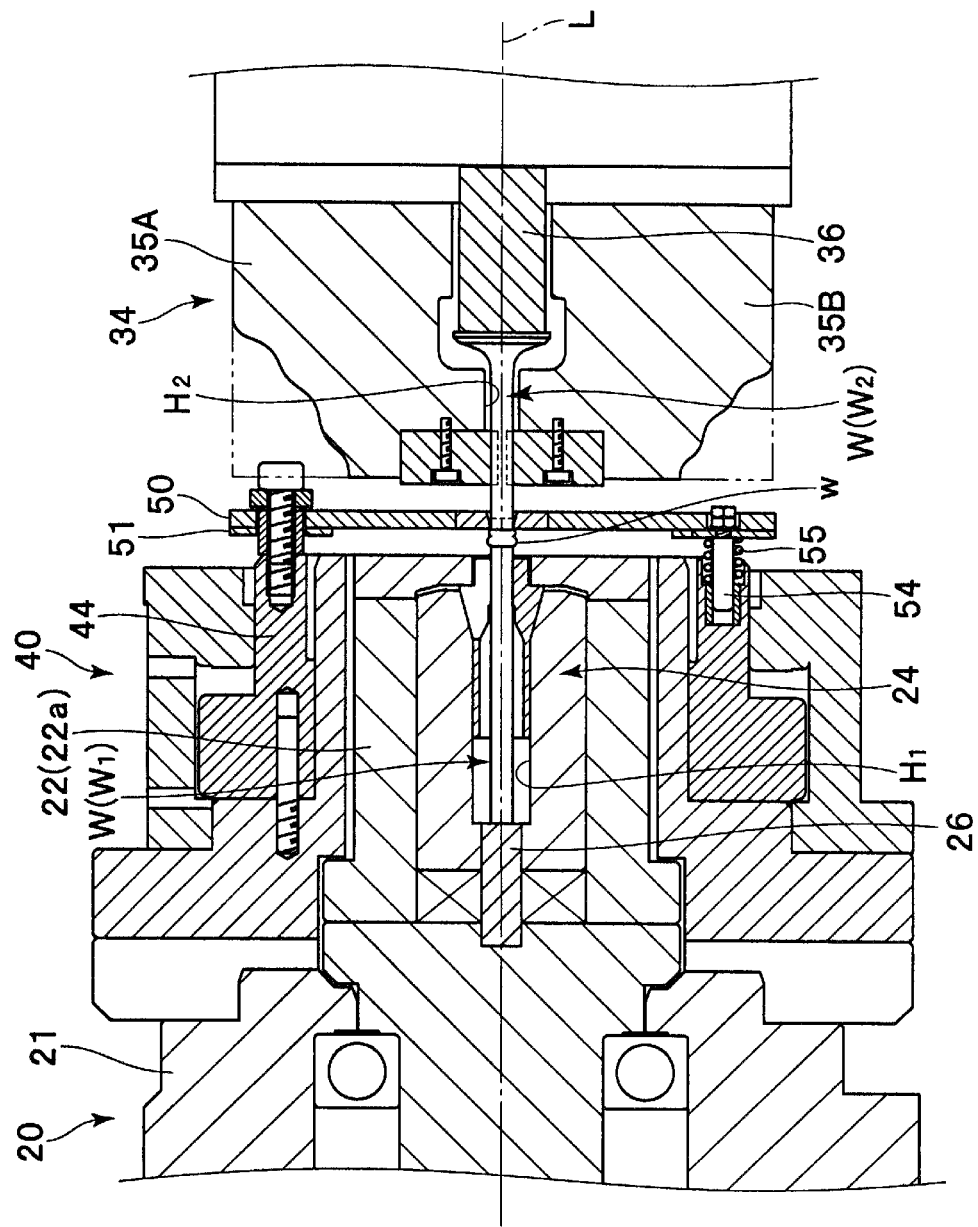
FIG. 9 shows in enlarged longitudinal cross section a relevant portion of the burring apparatus with the cutter moved to shear off the burr created.

Next, a hydraulic cylinder 40 is put into operation to move the cutter 50 towards the main spindle 22 to thereby shear off the burr w, as shown in FIG. 9.

Then the jointed work piece W is released from the chuck unit 24 of the main spindle 22 as shown in FIG. 10 and retracted from the main spindle 22 together with the slide 30 until the jointed work piece W is extracted from the insertion hole H1 and the doughnut shape cutter 50. As the jointed work piece W is withdrawn from the doughnut shape cutter 50, the ring shape burr w is removed from the jointed work piece W and drops off.

The burr w removed from the jointed work piece W behind the doughnut shape cutter 50 freely falls into a tray (not shown) without being caught by the arcuate sheet members 51 (51A and 51B), since arcuate sheet members 51 are spaced apart in the horizontal direction.

Finally, the jointed work piece W is released from the clamp unit 34 of the slide 30 and extracted from the work insertion hole H2 of the slide 30.

The burring apparatus of the invention is very simple and compact in structure in that the apparatus consists mainly of a doughnut shape cutter arranged between the spindle unit 20 and slide and a cutter drive means in the form of a hydraulic cylinder 40 mounted at the front end portion of the housing of the spindle unit 20. Thus, the friction welding machine equipped with this burring apparatus is compact, so that the friction welding machine does not take up a large space.

It should be appreciated that the cycle time of welding plus burring with this welding machine is extremely short since the burr w can be sheared off immediately after it is created.

It should be also appreciated that the burr w can be neatly and smoothly removed while it is soft since the burr w is sheared immediately after welding. In addition, the surface of the jointed work piece cleared of the burr w is smooth, so that post-welding treatment is simple.

Figure 11:
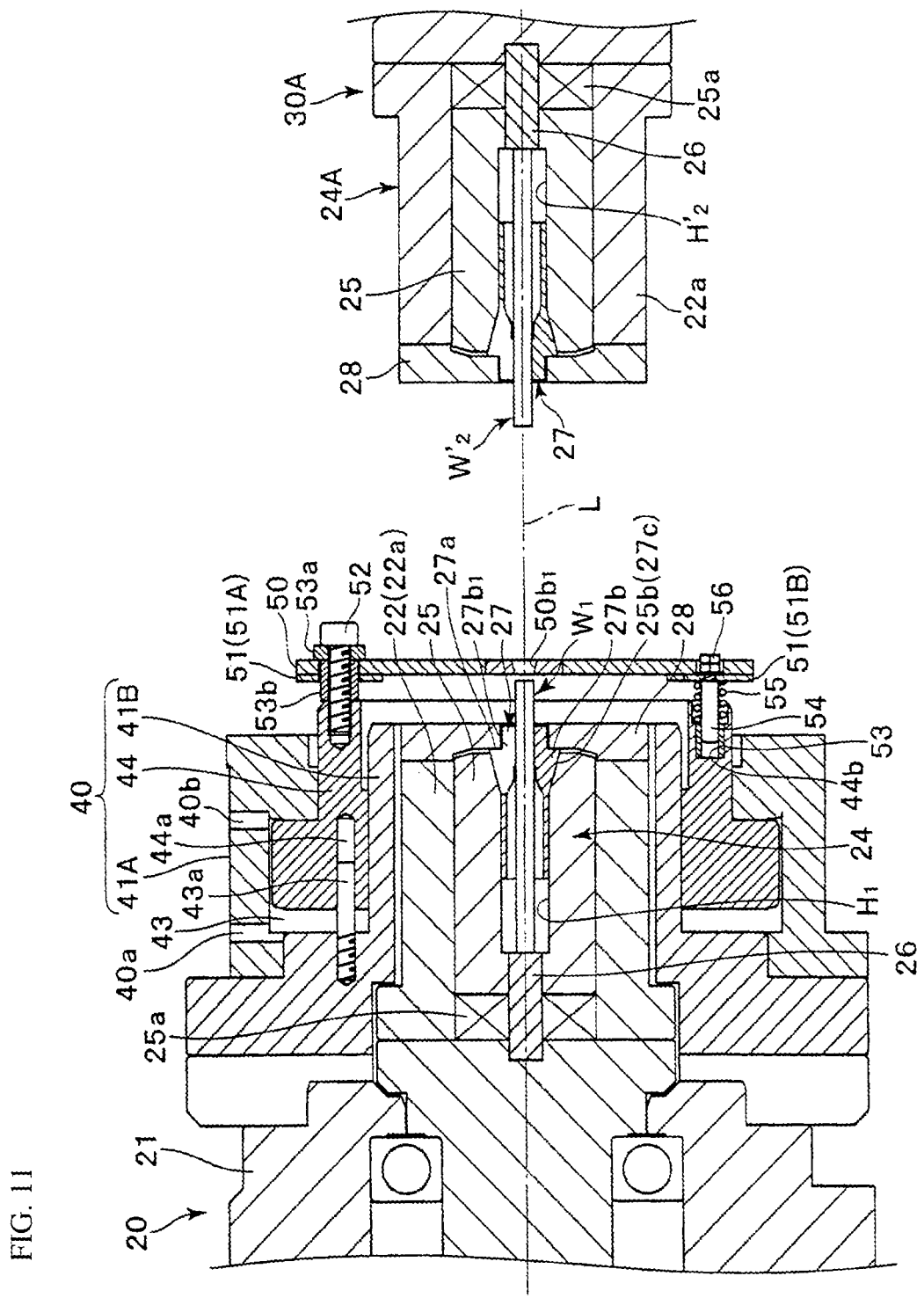
FIG. 11 shows in enlarged longitudinal cross section a relevant portion of a burring apparatus for a friction welding machine in accordance with a second embodiment of the invention.

Referring to FIG. 11, there is shown in longitudinal cross section a relevant portion of a friction welding machine equipped with a burring apparatus in accordance with a second embodiment of the invention.

In the foregoing first embodiment the work holding at the front end of the slide 30 is provided with a clamp unit 34 (consisting of the clamp jaws 35A and 35B) having a work insertion hole H2 adapted to receive from the side thereof a second rod shape work piece W2 having an umbrella-shaped portion which is diametrically larger than its stem. In the second embodiment, the inventive burring apparatus is designed for use with a friction welding machine for welding a first rod shape work piece W1 made of a mechanically strong metal and a second rod shape work piece W2' made of a good heat resistive metal (SUH35) and having substantially the same configuration as the first work piece W1.

For this purpose, a chuck unit 24A is provided at the front end of the slide 30 adapted to allow the insertion of the work piece W2' into the work insertion hole H2 from the front end thereof. The chuck unit 24A has the same structure as the chuck unit 24 of the work holding provided at the nose 22*a* of the spindle unit 20.

Other features of the second embodiment are the same as those of the first one, so that the same or like elements in both embodiments are referred to by the same reference numerals, and further description of the second embodiment will be omitted.

Figure 12:
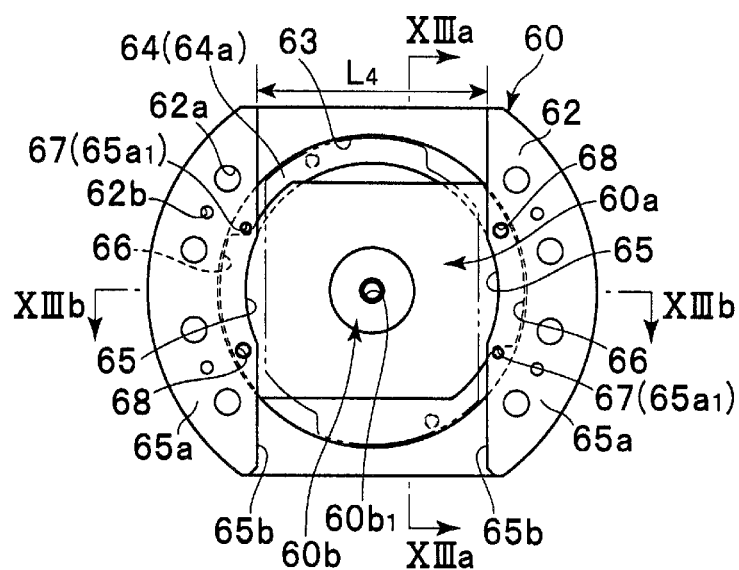
FIG. 12 shows a relevant portion of a burring apparatus, in the form of a doughnut shape cutter, for a friction welding machine in accordance with a third embodiment of the invention. More particularly.
Figure 12:
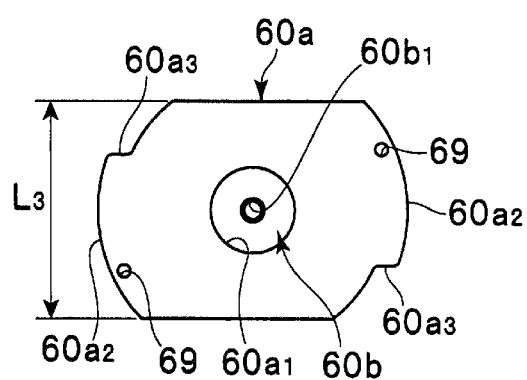
Figure 13:
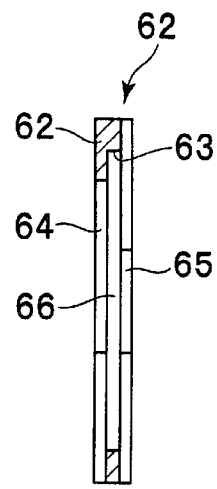
FIG. 13(a) show a longitudinal cross section taken along line XIIIa-XIIIa of FIG. 12(a), FIG. 13(b) a horizontal cross section of a holder cradle taken along line XIIb-XIIIb of FIG. 12(a), and FIG. 13(c) a partially cut-away perspective view of the holder cradle.
Figure 13:
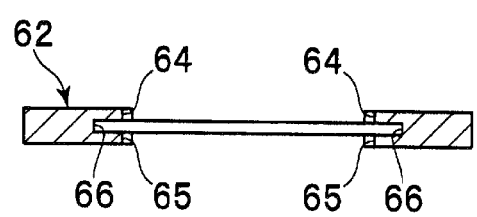
Figure 13:
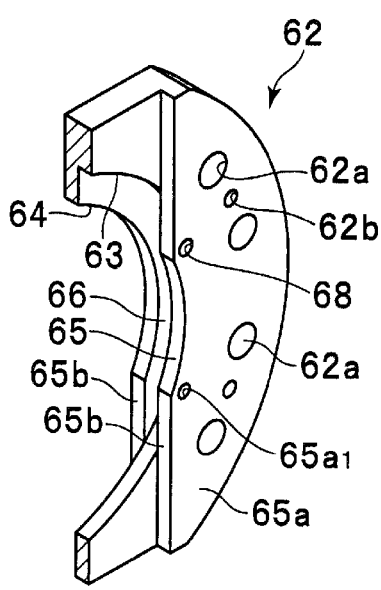

Referring to FIGS. 12 and 13, there is shown a relevant portion of the burring apparatus in the form of a doughnut shape cutter for friction welding machine in accordance with a third embodiment of the invention. More particularly, FIG. 12(*a*) shows a front view of the doughnut shape cutter; FIG. 12(*b*) a front view of the relevant portion of the cutter blade; FIG. 13(*a*) vertical cross section of a holder cradle taken along line XIIIa-XIIIa of FIG. 12(*a*); FIG. 13(*c*) a perspective view of the holder cradle with a portion thereof cut away.

Reference numeral 60 indicates a doughnut shape cutter 60, which consists of a disk-shaped holder cradle 62 having a large circular hole 63, a bayonet-type cutter holder 60*a* that engages with a slide groove 66 formed in the inner circumference of the holder table 62; and a cutter brade 60*b* securely fixed in the engagement hole 60*a*1 formed in the central area of the cutter holder 60*a* by means of a screw for example. The cutter brade 60*b* has a central circular hole 60*b*1 for shearing a burr.

There is provided along the edge of the inner periphery of the circular hole 63 a rear flange 64 flush with the back end of the holder cradle 62. Formed on the opposite sides of the circular hole 63 formed in the front end of the holder cradle 62 are a pair of right and left flanges 65 in association with the rear flange 64. Formed between the flanges 64 and 65 and along the inner circumference of the circular hole 63 are a pair of left and right arcuate slide grooves 66.

On the other hand, right and left edges 60a2 of the cutter holder 60a are arcuately shaped so as to engage with the slide groove 66 of the holder cradle 62. The vertical length L3 of the cutter holder 60a is slightly shorter than the width L4 of the flange sections 65a of the flange sections 65 of the holder cradle 62. As shown in phantom outline in FIG. 12(a), the bayonet-type cutter holder 60a is first placed in abutment against the rear flange section 64 with the length of the cutter holder 60a being vertical. By rotating the the cutter holder 60a in the clockwise direction until the edges 60a1 and 60a2 of the cutter holder 60a come into bayonet-engagement with the slide grooves 66, the cutter holder 60a is held flush with the fringe of the circular hole 63.

Reference numeral 67 indicates positioning pins for positioning the holder cradle 62 at a right angular position with respect to the cutter holder 60a. The positioning pins 67 are force fitted in the circular holes 65a1 formed in the front flange 65 of the holder cradle 62 and protrude into the slide groove 66 to position the cutter holder 60a when the positioning pins 67 abut against the side edges 60a3 of the cutter holder 60a. When the cutter holder 60a is correctly positioned, bolt insertion holes 68 and 69 of the holder cradle 62 and cutter holder 60a, respectively, are mutually aligned. As a consequence, the cutter holder 60a can be securely fixed to the holder cradle 62 with bolts (not shown) screwed into the holes 69 of the cutter holder 60a through the hole 68 of the holder cradle 62.

On the other hand, the cutter holder 60a can be easily dismounted from the holder cradle 62 by unscrewing the bolts (not shown) and rotating the cutter holder 60a in the counterclockwise direction through 90 degrees to disengage the side edges 60a2 from the slide groove 66 of the holder cradle 62. It is noted that this embodiment provides the cutter holder 60a that can be easily mounted on and dismounted from the holder cradle 62 connected to the piston 44 in replacing the cutter blade 60b, as opposed to the first embodiment that requires laborious steps to dismount the cutter holder 60a from the piston 44 to change the cutter blade 50b.

Reference numerals 62a and 62b indicate holes formed in the holder cradle 62 for passing therethrough fixing bolts 52 and male guide pin 54, respectively (FIG. 5).

As shown in FIG. 12(a), the upper region 64a of the rear flange 64 has an arcuate shape, while the lower region of the rear flange 64 is partly cut away in association with the space between the opposing sides 65b of the flange forming areas 65a that provide the flanges 65. Thus, there is nothing behind or below the circular hole 60b1 of the cutter blade 60b that prevents the sheared burr w from freely falling into a tray (not shown) below the cutter 60 after it is sheared off from the jointed work piece W in the burring operation.

Other features of the third embodiment are the same as those of the first. The same or like elements of the first and third embodiments are referred to by the same reference numerals, and further description of the third embodiment will be omitted.

Incidentally, it will be recalled that in the foregoing first through third embodiments the doughnut shape cutter (50 or 60) mounted on the front end of the piston 44 is retracted when it is pressed backward against the urging force of a spring, and that the overhang d of the second rod shape work piece W2 is made sufficiently short so that the work holding 34 at the front end of the slide 30 barely interferes with the cutter 50 (60) in the process of friction welding, thereby minimizing a possible axial misalignment of the work pieces W1 and W2 with respect to the axis L. Alternatively, the overhang d of the second work piece W2 may be set to a predetermined length such that the clamp unit 34 at the front end of the slide 30 will not interfere with the doughnut shape cutter 50 during the friction welding of the work pieces W1 and W2 (or W2') on one axial side of the cutter 50 proximate to the main spindle 22. In this arrangement, the cutter 50 need be simply secured to the front end of the piston 44 with fixing bolts for example. In other words, a complex structure for pushing back the doughnut shape cutter 50 along the axis L with the slide 30 is not needed.

The hydraulic cylinder 40 serving as a cutter drive means for moving the doughnut shape cutter 50 along the axis L of the main spindle 22 as described in the first through third embodiments may be replaced by any other hydraulic cylinder including a pneumatic cylinder.

It is described in the second embodiment that the first rod shape work piece W1 is made of a mechanically strong metal (SUH11) and mounted on the main spindle 22 while the second rod shape work piece W2' is made of a thermally good conductive metal (SUH35) and mounted on the slide 30 and pressed against the end of the first work piece W1 for friction welding. Alternatively, the first rod shape work piece W1 may be made of a good heat resistive metal (SUH35) while the second rod shape work piece W2 is made of a mechanically strong metal (SUH11) and moved forward to be pressed onto the first rod shape work piece W1 in rotation for friction welding.

Although it has been described in the foregoing examples that one of the two welding work pieces is SUH35 and the other is SUH11, the work pieces W1 and W2 are not limited to these metals and may be selected from other metal combinations that can be friction pressure welded.

Notations
  10 friction welding machine
  12 main frame
  20 spindle unit
  21 casing of main spindle(housing of spindle unit)
  main spindle
  22a nose of main spindle
  23 servomotor for driving spindle
  24 collet chuck unit (work holding clamp unit)
  25 sleeve
  26 stopper
  27 collet chuck
  30 slide
  31 linear guide
  32 servomotor for driving slide
  33 ball screw
  34 clamp unit serving as work holding
  35A and 35B clamp jaws
  H2 work insertion hole
  d hangover of second rod work
  40 hydraulic cylinder serving as cutter drive means
  44 piston
  50 and 60 doughnut shape cutters
  50b1 and 60b1 circular holes of cutters
  51 (51A and 51B) arcuate sheet members
  52 fixing bolt
  54 guide pins
  55 compression coil spring
  W1 first rod shape work piece
  W2 and WT second rod shape work piece
  W jointed work piece
  w ring shape bur

The invention claimed is:

1. A burring apparatus for a friction welding machine, comprising:
   a horizontally arranged main spindle;
   a first work holder, provided at a nose of the main spindle, for gripping a first rod shape work piece coaxially with the main spindle, the first work holder being capable of rotating the first rod shape work piece;
   a slide movable to and away from the main spindle, along the axis of the main spindle;
   a second work holder, mounted on a front end of the slide, in opposition to the nose of the main spindle, for gripping a second rod shape work piece of the same diameter as the first rod shape work piece coaxially with the first rod shape work piece, and
   a doughnut shape cutter having an inner diameter slightly larger than the outer diameter of the first and second rod shape work pieces,
   wherein the doughnut shape cutter is connected to, and movable by, a cutter driver mounted on a housing of the main spindle, the doughnut shape cutter being movable in the axial direction of the main spindle independently of the slide,
   wherein the doughnut shape cutter is disposed in a region ahead of the main spindle and the first rod shape work piece gripped by the first work holder, in a direction towards the second work holder, and
   wherein the cutter driver is an annular hydraulic cylinder for moving the cutter, the hydraulic cylinder mounted coaxially with, and surrounding, a front end portion of a casing of the main spindle and accommodating the first work holder.

2. The burring apparatus according to claim 1, wherein the doughnut shape cutter is initially spaced away from a front end of the first rod shape work piece gripped by the first work holder by a minimum distance, such that the doughnut shape cutter will not touch a burr that could be formed in friction welding.

3. The burring apparatus according to claim 1,
   wherein the hydraulic cylinder has an annular piston, a front end of which is connected to doughnut shape cutter guide pins, such that the doughnut shape cutter is slidable in the axial direction of the hydraulic cylinder;
   wherein the doughnut shape cutter is urged by a spring member, provided between the piston and the doughnut shape cutter, in a direction away from the piston, and
   wherein the doughnut shape cutter is pressed and moved backward by a front end of the slide when the second rod shape work piece is moved toward the first rod shape work piece for the friction welding.

4. The burring apparatus according to claim 3, wherein the inner diameter of the doughnut shape cutter is about 1.1 times the outer diameter of the first and second rod shape work pieces.

5. The burring apparatus according to claim 2, wherein the inner diameter of the doughnut shape cutter is about 1.1 times the outer diameter of the first and second rod shape work pieces.

6. The burring apparatus according to claim 1,
   wherein the hydraulic cylinder has an annular piston, a front end of which is connected to doughnut shape cutter guide pins, such that the doughnut shape cutter is slidable in the axial direction of the hydraulic cylinder;
   wherein the doughnut shape cutter is urged by a spring member, provided between the piston and the doughnut shape cutter, in a direction away from the piston, and
   wherein the doughnut shape cutter is pressed and moved backward by a front end of the slide when the second rod shape work piece is moved toward the first rod shape work piece for the friction welding.

7. The burring apparatus according to claim 6, wherein the inner diameter of the doughnut shape cutter is about 1.1 times the outer diameter of the first and second rod shape work pieces.

8. A burring apparatus for a friction welding machine, comprising:
   a horizontally arranged main spindle;
   a first work holder, provided at a nose of the main spindle, for gripping a first rod shape work piece coaxially with the main spindle, the first work holder being capable of rotating the first rod shape work piece;
   a slide movable to and away from the main spindle, along the axis of the main spindle;
   a second work holder, mounted on a front end of the slide, in opposition to the nose of the main spindle, for gripping a second rod shape work piece of the same diameter as the first rod shape work piece coaxially with the first rod shape work piece, and
   a doughnut shape cutter having an inner diameter slightly larger than the outer diameter of the first and second rod shape work pieces,
   wherein the doughnut shape cutter is connected to, and movable by, a cutter driver mounted on a housing of the main spindle, the doughnut shape cutter being movable in the axial direction of the main spindle independently of the slide,
   wherein the doughnut shape cutter is disposed in a region ahead of the main spindle and the first rod shape work piece gripped by the first work holder, in a direction towards the second work holder,
   wherein the doughnut shape cutter is initially spaced away from a front end of the first rod shape work piece gripped by the first work holder by a minimum distance, such that the doughnut shape cutter will not touch a burr that could be formed in friction welding,
   wherein the cutter driver is a hydraulic cylinder which has an annular piston, a front end of which is connected to doughnut shape cutter guide pins, such that the doughnut shape cutter is slidable in the axial direction of the hydraulic cylinder;
   wherein the doughnut shape cutter is urged by a spring member, provided between the piston and the doughnut shape cutter, in a direction away from the piston, and
   wherein the doughnut shape cutter is pressed and moved backward by a front end of the slide when the second rod shape work piece is moved toward the first rod shape work piece for the friction welding.

9. The burring apparatus according to claim 8, wherein the inner diameter of the doughnut shape cutter is about 1.1 times the outer diameter of the first and second rod shape work pieces.

10. A burring apparatus for a friction welding machine, comprising:
    a horizontally arranged main spindle;
    a first work holder, provided at a nose of the main spindle, for gripping a first rod shape work piece coaxially with the main spindle, the first work holder being capable of rotating the first rod shape work piece;
    a slide movable to and away from the main spindle, along the axis of the main spindle;
    a second work holder, mounted on a front end of the slide, in opposition to the nose of the main spindle, for gripping a second rod shape work piece of the same diameter as the first rod shape work piece coaxially with the first rod shape work piece, and a doughnut shape cutter having an inner diameter slightly larger than the outer diameter of the first and second rod shape work pieces, wherein the doughnut shape cutter is connected to, and movable by, a cutter driver mounted on a housing of the main spindle, the doughnut shape cutter being movable in the axial direction of the main spindle independently of the slide, wherein the doughnut shape cutter is disposed in a region ahead of the main spindle and the first rod shape work piece gripped by the first work holder, in a direction towards the second work holder, wherein the cutter driver is a hydraulic cylinder which has an annular piston, a front end of which is connected to doughnut shape cutter guide pins, such that the doughnut shape cutter is slidable in the axial direction of the hydraulic cylinder;

wherein the doughnut shape cutter is urged by a spring member, provided between the piston and the doughnut shape cutter, in a direction away from the piston, and wherein the doughnut shape cutter is pressed and moved backward by a front end of the slide when the second rod shape work piece is moved toward the first rod shape work piece for the friction welding.

11. The burring apparatus according to claim 10, wherein the inner diameter of the doughnut shape cutter is about 1.1 times the outer diameter of the first and second rod shape work pieces.

12. The burring apparatus according to claim 1, wherein the inner diameter of the doughnut shape cutter is about 1.1 times the outer diameter of the first and second rod shape work pieces.

13. A burring apparatus for a friction welding machine, comprising:

a horizontally arranged main spindle;

a first work holder, provided at a nose of the main spindle, for gripping a first rod shape work piece coaxially with the main spindle, the first work holder being capable of rotating the first rod shape work piece;

a slide movable to and away from the main spindle, along the axis of the main spindle;

a second work holder, mounted on a front end of the slide, in opposition to the nose of the main spindle, for gripping a second rod shape work piece of the same diameter as the first rod shape work piece coaxially with the first rod shape work piece, and a doughnut shape cutter having an inner diameter slightly larger than the outer diameter of the first and second rod shape work pieces, wherein the doughnut shape cutter is connected to, and movable by, a cutter driver mounted on a housing of the main spindle, the doughnut shape cutter being movable in the axial direction of the main spindle independently of the slide, wherein the doughnut shape cutter is disposed in a region ahead of the main spindle and the first rod shape work piece gripped by the first work holder, in a direction towards the second work holder, and wherein the cutter driver is an annular pneumatic cylinder for moving the cutter, the pneumatic cylinder mounted coaxially with, and surrounding, a front end portion of a casing of the main spindle and accommodating the first work holder.

14. The burring apparatus according to claim 13, wherein the doughnut shape cutter is initially spaced away from a front end of the first rod shape work piece gripped by the first work holder by a minimum distance, such that the doughnut shape cutter will not touch a burr that could be formed in friction welding.

15. The burring apparatus according to claim 14,
wherein the pneumatic cylinder has an annular piston, a front end of which is connected to doughnut shape cutter guide pins, such that the doughnut shape cutter is slidable in the axial direction of the pneumatic cylinder;
wherein the doughnut shape cutter is urged by a spring member, provided between the piston and the doughnut shape cutter, in a direction away from the piston, and
wherein the doughnut shape cutter is pressed and moved backward by a front end of the slide when the second rod shape work piece is moved toward the first rod shape work piece for the friction welding.

16. The burring apparatus according to claim 15, wherein the inner diameter of the doughnut shape cutter is about 1.1 times the outer diameter of the first and second rod shape work pieces.

17. The burring apparatus according to claim 14, wherein the inner diameter of the doughnut shape cutter is about 1.1 times the outer diameter of the first and second rod shape work pieces.

18. The burring apparatus according to claim 13,
wherein the pneumatic cylinder has an annular piston, a front end of which is connected to doughnut shape cutter guide pins, such that the doughnut shape cutter is slidable in the axial direction of the pneumatic cylinder;
wherein the doughnut shape cutter is urged by a spring member, provided between the piston and the doughnut shape cutter, in a direction away from the piston, and
wherein the doughnut shape cutter is pressed and moved backward by a front end of the slide when the second rod shape work piece is moved toward the first rod shape work piece for the friction welding.

19. The burring apparatus according to claim 18, wherein the inner diameter of the doughnut shape cutter is about 1.1 times the outer diameter of the first and second rod shape work pieces.

20. A burring apparatus for a friction welding machine, comprising:

a horizontally arranged main spindle;

a first work holder, provided at a nose of the main spindle, for gripping a first rod shape work piece coaxially with the main spindle, the first work holder being capable of rotating the first rod shape work piece;

a slide movable to and away from the main spindle, along the axis of the main spindle;

a second work holder, mounted on a front end of the slide, in opposition to the nose of the main spindle, for gripping a second rod shape work piece of the same diameter as the first rod shape work piece coaxially with the first rod shape work piece, and a doughnut shape cutter having an inner diameter slightly larger than the outer diameter of the first and second rod shape work pieces, wherein the doughnut shape cutter is connected to, and movable by, a cutter driver mounted on a housing of the main spindle, the doughnut shape cutter being movable in the axial direction of the main spindle independently of the slide, wherein the doughnut shape cutter is disposed in a region ahead of the main spindle and the first rod shape work piece gripped by the first work holder, in a direction towards the second work holder, wherein the doughnut shape cutter is initially spaced away from a front end of the first rod shape work piece gripped by the first work holder by a minimum distance, such that the doughnut shape cutter will not touch a burr that could be formed in friction welding, wherein the cutter driver is a pneumatic cylinder which has an annular piston, a front end of which is connected to doughnut shape cutter guide pins, such that the doughnut shape cutter is slidable in the axial direction of the pneumatic cylinder;

wherein the doughnut shape cutter is urged by a spring member, provided between the piston and the doughnut shape cutter, in a direction away from the piston, and wherein the doughnut shape cutter is pressed and moved backward by a front end of the slide when the second rod shape work piece is moved toward the first rod shape work piece for the friction welding.

21. The burring apparatus according to claim 20, wherein the inner diameter of the doughnut shape cutter is about 1.1 times the outer diameter of the first and second rod shape work pieces.

22. A burring apparatus for a friction welding machine, comprising:
- a horizontally arranged main spindle;
- a first work holder, provided at a nose of the main spindle, for gripping a first rod shape work piece coaxially with the main spindle, the first work holder being capable of rotating the first rod shape work piece;
- a slide movable to and away from the main spindle, along the axis of the main spindle;
- a second work holder, mounted on a front end of the slide, in opposition to the nose of the main spindle, for gripping a second rod shape work piece of the same diameter as the first rod shape work piece coaxially with the first rod shape work piece, and
- a doughnut shape cutter having an inner diameter slightly larger than the outer diameter of the first and second rod shape work pieces, wherein the doughnut shape cutter is connected to, and movable by, a cutter driver mounted on a housing of the main spindle, the doughnut shape cutter being movable in the axial direction of the main spindle independently of the slide, wherein the doughnut shape cutter is disposed in a region ahead of the main spindle and the first rod shape work piece gripped by the first work holder, in a direction towards the second work holder, wherein the cutter driver is a pneumatic cylinder which has an annular piston, a front end of which is connected to doughnut shape cutter guide pins, such that the doughnut shape cutter is slidable in the axial direction of the pneumatic cylinder;

wherein the doughnut shape cutter is urged by a spring member, provided between the piston and the doughnut shape cutter, in a direction away from the piston, and wherein the doughnut shape cutter is pressed and moved backward by a front end of the slide when the second rod shape work piece is moved toward the first rod shape work piece for the friction welding.

23. The burring apparatus according to claim 22, wherein the inner diameter of the doughnut shape cutter is about 1.1 times the outer diameter of the first and second rod shape work pieces.

24. The burring apparatus according to claim 13, wherein the inner diameter of the doughnut shape cutter is about 1.1 times the outer diameter of the first and second rod shape work pieces.

* * * * *